United States Patent Office 3,516,816
Patented June 23, 1970

3,516,816
HERBICIDAL COMPOSITIONS AND METHODS UTILIZING ALKYLENEIMINOUREA COMPOUNDS
Don L. Hunter, Long Beach, and Cecil W. Le Fevre, Anaheim, Calif., assignors to United States Borax & Chemical Corporation, Los Angeles, Calif., a corporation of Nevada
No Drawing. Filed May 19, 1967, Ser. No. 639,654
Int. Cl. A01n 9/00
U.S. Cl. 71—88                 10 Claims

ABSTRACT OF THE DISCLOSURE

Novel 1 - (2 - cyanophenyl) - 3 - alkyleneiminourea compounds are provided. The compounds are especially useful as herbicides and can be formulated to provide herbicidal compositions.

---

This invention relates to herbicidal compositions and methods utilizing 2-cyanophenyl alkyleneiminourea compounds. According to the present invention there are provided herbicidal compositions and methods utilizing compounds of the formula

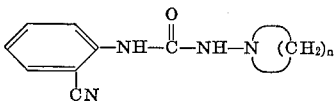

wherein $n$ is an integer of from about 4 to about 7 inclusive. Thus, the alkyleneimino group can be tetramethyleneimino, pentamethyleneimino, hexamethyleneimino, heptomethyleneimino, and the like.

The compounds of the present invention are generally crystalline solids which are soluble in the usual organic solvents such as alcohols, ether, benzene, and acetone. They are readily prepared by reaction of the corresponding N-aminoalkyleneimine with 2-cyanophenyl isocyanate. The reaction can be illustrated by the following equation in which $n$ has the significance previously assigned.

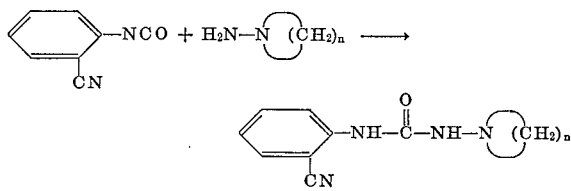

The reaction takes place at relatively low temperatures, such as below about 50° C., preferably in the presence of a solvent such as diethyl ether. Higher temperatures, such as above about 50° C. should be avoided as the resultant product will cyclize readily to the corresponding quinazoline-2-imino-4-one. The resultant 2-cyanophenyl alkyleneiminourea is isolated and purified by conventional procedures, such as recrystallization from a suitable solvent, such as ether or hexane.

The intermediate 2-cyanophenyl isocyanate can be prepared by reaction of 2-cyanoaniline with phosgene according to known procedures.

The following examples are presented to illustrate preparation of typical compounds of the invention but the scope of the invention is not to be considered limited to the specific examples given.

EXAMPLE I 1-(2-cyanophenyl)-3-pentamethyleneiminourea

A 200 ml. round-bottomed flask equipped with a magnetic stirrer and reflux condenser was charged with 1.75 grams (0.017 mole) of N-aminopentamethyleneimine, 2.50 grams (0.017 mole) of 2-cyanophenyl isocyanate and 50 ml. of diethyl ether. The reaction mixture was refluxed for three hours. On cooling, the product crystallized and was isolated by filtration to give 2.38 grams of a white crystalline solid. The filtrate was reduced in volume to about 25 ml. and cooled. More white crystalline solid precipitated which on filtering and drying gave an additional 0.85 gram of product. The filtrate was then stripped to dryness and the residue was dissolved in 15 ml. of 3:1 pentane-ether. This solution on cooling gave a third crop of product (0.32 gram) for a total yield of product of 3.55 grams (83.5%). After recrystallization from hexane the product melted at 118.5° C. (with resolidification).

EXAMPLE II 1-(2-cyanophenyl)-3-hexamethyleneiminourea

To apparatus identical to that described above was added 1.98 grams (0.017 mole) of N-aminohexamethyleneimine, 2.50 grams (0.017 mole) of 2-cyanophenyl isocyanate and 50 ml. of diethyl ether. The reaction mixture was refluxed for three hours and the solvent was then removed at reduced pressure on a Rinco evaporator. The residue was treated with 70 ml. of a 5:2 mixture of refluxing pentane-ether. The hot solution was decanted away from the undissolved solids and on cooling the product crystallized as white needles. The undissolved material remaining after the first treatment with pentane-ether was dissolved in a 3:1 mixture of hot pentane-ether which on cooling gave a second crop of product. The combined yield of product was 3.28 grams (73.2%) which melted at 94°–95.5° C. After recrystallization from hexane, the product melted at 92.5°–93.5° C.

Other representative compounds within the scope of this invention, which can be prepared according to the above procedures, include 1-(2-cyanophenyl) - 3 - tetramethyleneiminourea and 1-(2-cyanophenyl)-3-heptamethyleneiminourea.

The alkyleneiminourea compounds of this invention are effective herbicides useful for controlling weeds. "Weeds" as used herein is intended to include any plant growth which is undesirable. The compounds are useful as a pre-emergence or post-emergence treatment; that is, they can be used to kill or suppress the growth of plants or to kill or prevent the emergence of seedlings of unwanted plants. Thus, the compounds can be used to control the growth of weeds by applying a phytotoxic amount to the locus of the weeds, that is, the foliage of the growing plants or soil in which the weeds are growing or would grow. Generally an application rate of from about 0.1 to about 25 pounds of one or more of the active compounds per acre is an effective phytotoxic amount although greater or lesser amounts can be used if desired. The presently preferred rate of application is in the range of from about 1 to about 10 pounds per acre. At lower application rates the compounds have selective activity and are especially useful for controlling weed growth in desirable crops such as peanuts, sugar beets, safflower and cotton.

The following examples illustrate the herbicidal activity of representative compounds of this invention.

EXAMPLE III

Greenhouse flats were planted to the twelve weed species, mustard, bindweed, ragweed, velvetleaf, lamb's quarter, pigweed, foxtail, cheat, water grass, wild oats, Johnson grass and crabgrass. Immediately after planting the flats were sprayed with an ethanol-dioxane solution of 1-(2-cyanophenyl)-3-pentamethyleneiminourea at a rate of 4 pounds per acre. Thirty-four days after treatment, the flats were evaluated for herbicidal activity and rated on a 0–10 scale in which 0=no effect and 10=100% kill. The results obtained were recorded as follows:

| Weed: | Herbicidal effect |
|---|---|
| Mustard | 10 |
| Bindweed | 9 |
| Ragweed | 10 |
| Velvetleaf | 10 |
| Lamb's-quarter | 10 |
| Pigweed | 10 |
| Foxtail | 9 |
| Cheat | 8 |
| Water grass | 10 |
| Wild oats | 9 |
| Johnson grass | 10 |
| Crabgrass | 10 |

EXAMPLE IV

Greenhouse flats were planted to the twelve weed species, mustard, bindweed, ragweed, velvetleaf, lamb's-quarter, pigweed, foxtail, cheat, water grass, wild oats, Johnson grass, and crabgrass. When the plants were about 1–3 inches tall, they were sprayed with an isopropanol-dioxane solution of 1-(2-cyanophenyl)-3-hexamethyleneiminourea at an application rate of 2.5 pounds per acre. Thirty-five days after treatment, the flats were evaluated for herbicidal activity and rated on a 0 to 10 scale in which 0=no effect and 10=100% kill. The following results were recorded.

| Weed: | Herbicidal effect |
|---|---|
| Mustard | 10 |
| Bindweed | 6 |
| Ragweed | 9 |
| Velvetleaf | 10 |
| Lamb's-quarter | 9 |
| Pigweed | 9 |
| Foxtail | 9 |
| Cheat | 10 |
| Water grass | 10 |
| Wild oats | 10 |
| Johnson grass | 9 |
| Crabgrass | 10 |

Since a relatively small amount of one or more of the active alkyleneiminourea compounds should be uniformly distributed over the area to be treated, the compounds preferably are formulated with conventional herbicide carriers, either liquid or solid. Thus, the compounds can be impregnated on or admixed with a pulverulent solid carrier such as lime, talc, clay, bentonite, calcium chloride, vermiculite, calcium carbonate, and the like. Alternatively, the compounds can be dissolved or suspended in a liquid carrier such as water, kerosene, alcohols, Diesel oil, xylene, benzene, glycols, and the like. A surfactant preferably is included to aid in dispersion, emulsification and coverage. The surfactant can be ionic or nonionic, and may be a liquid or a solid. The use of the term "surfactant" herein is intended to include such compounds commonly referred to as wetting agents, dispersing agents, and emulsifying agents. Typical surfactants include the alkylarylsulfonates, the fatty alcohol sulfates, sodium salt of naphthalenesulfonic acid, alkylaryl polyether alcohols, long chain quaternary ammonium compounds, sodium salts of petroleum-derived alkylsulfonic acids, polyoxyethylene-sorbitan monolaurate, and the like. These dispersing and wetting agents are sold under numerous trademarks and may either be pure compounds, mixtures of compounds of the same general group, or they may be mixtures of compounds of different classes. Surfactants can also be included in compositions containing a solid inert carrier.

Concentrated compositions containing the active agent which can be subsequently diluted, as with water, to the desired concentration for application to plants and soil are also provided. The advantages of such concentrates are that they are prepared by the manufacturer in a form such that the user need only mix them with a locally available carrier, preferably water, thereby keeping shipping costs to a minimum while provided a product which can be used with a minimum of equipment and effort. Such concentrates may contain from about 5 to about 90 percent by weight of one or more of the active alkyleneiminourea compounds with a carrier or diluent, which may be a solid or liquid. Liquid carriers which are miscible with the active agent or other liquids in which the compounds may be suspended or dispersed may be used. A surfactant is also generally included to facilitate such dilution or dispersion in water. However, the surfactant itself may comprise the carrier in such concentrates.

The herbicidal compositions can include other beneficial adjuvants, such as humectants, oils and contact agents. Also, other herbicides, such as the sodium borates, sodium chlorates, chlorophenoxyacetic acids, triazines, substituted ureas, uracils, carbamates, halobenzoic acids, haloalkanoic acids, anilides, pyridinols and picolinic acids, can be included in the formulations.

Reference is made to the copending application of Don L. Hunter, Ser. No. 639,611, filed on even date herewith, which describes and claims the novel 1-(2-cyanophenyl)-3-alkyleneiminourea compounds.

Various changes and modifications of the invention can be made to the extent that such variations incorporate the spirit of this invention.

What is claimed is:

1. A herbicidal composition comprising a phytotoxic amount of a compound of the formula

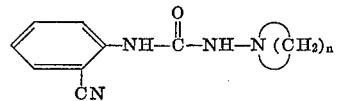

wherein $n$ is an integer of from 4 to 7 inclusive, and an inert carrier therefor.

2. A herbicidal composition according to claim 1 in which a surfactant is included.

3. A herbicidal composition according to claim 1 in which said compound is 1-(2-cyanophenyl)-3-pentamethyleneiminourea.

4. A herbicidal composition according to claim 1 in which said compound is 1-(2-cyanophenyl)-3-hexamethyleneiminourea.

5. The method of controlling weed growth which comprises applying to the locus of said weeds a phytotoxic amount of a compound of the formula

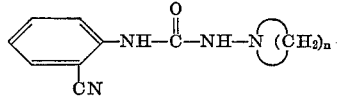

in which $n$ is an integer of from 4 to 7 inclusive.

6. The method according to claim 5 in which said compound is 1-(2-cyanophenyl)-3-hexamethyleneiminourea.

7. The method according to claim 5 in which said compound is 1-(2-cyanophenyl)-3-pentamethyleneiminourea.

8. The method according to claim 5 in which said compound is applied at a rate of from about 1 to about 10 pounds per acre.

9. The method according to claim 5 in which said compound is 1-(2-cyanophenyl)-3-tetramethyleneiminourea.

10. The method according to claim 5 in which said compound is 1-(2-cyanophenyl)-3-heptamethyleneiminourea.

References Cited

UNITED STATES PATENTS 2,780,535  2/1957  Snyder _____ 71—120

FOREIGN PATENTS 1,032,023  6/1958  Germany.

JAMES O. THOMAS, JR., Primary Examiner

U.S. Cl. X.R.

260—239; 71—82, 92, 93, 94, 111, 113, 115, 116, 118, 120, 128